(12) United States Patent
Skinner (10) Patent No.: US 9,727,291 B1
(45) Date of Patent: Aug. 8, 2017

(54) APPARATUS FOR INTERFACING WIRELESS DEVICES TO A PERIPHERAL DEVICE

(71) Applicant: Marvell International Ltd., Hamilton (BM)

(72) Inventor: Davey N. Skinner, Boise, ID (US)

(73) Assignee: Marvell International Ltd., Hamilton (BM)

( * ) Notice: Subject to any disclaimer, the term of this patent is extended or adjusted under 35 U.S.C. 154(b) by 284 days.

(21) Appl. No.: 14/157,832

(22) Filed: Jan. 17, 2014

Related U.S. Application Data (60) Provisional application No. 61/753,599, filed on Jan. 17, 2013, provisional application No. 61/755,712, filed on Jan. 23, 2013.

(51) Int. Cl.
*G06F 13/12* (2006.01)
*G06F 3/12* (2006.01)
*G06F 13/14* (2006.01)
*H04N 1/00* (2006.01)

(52) U.S. Cl.
CPC .......... *G06F 3/1292* (2013.01); *G06F 3/1236* (2013.01); *G06F 13/14* (2013.01); *H04N 1/00127* (2013.01)

(58) Field of Classification Search
CPC .................................................. G06Q 20/202
See application file for complete search history.

(56) References Cited

U.S. PATENT DOCUMENTS

| | | | |
|---|---|---|---|
| 7,255,582 B1* | 8/2007 | Liao | 439/165 |
| 7,938,653 B2* | 5/2011 | Hopwood | 439/131 |
| 8,189,225 B1* | 5/2012 | Lo | 358/1.15 |
| 2002/0053622 A1* | 5/2002 | Kagel | 242/379 |
| 2013/0254560 A1* | 9/2013 | Leung | 713/300 |

* cited by examiner

*Primary Examiner* — Henry Tsai
*Assistant Examiner* — Juanito Borromeo
(74) *Attorney, Agent, or Firm* — Lee & Hayes, PLLC (57) ABSTRACT

Embodiments of the present disclosure provide an apparatus including an arrangement configured to couple the apparatus to an alternating current (AC) outlet. The apparatus further includes a plurality of interfaces, wherein a first interface of the plurality of interfaces is configured to couple the apparatus to a wireless computing device, and wherein a second interface of the plurality of interfaces is configured to couple the apparatus to a peripheral device that is peripheral to the wireless computing device. The apparatus also includes a memory configured to store logic, wherein the logic is configured to receive, via the first interface, an operation from the wireless computing device, and send, via the second interface, the operation to the first device that is peripheral to the wireless computing device. The apparatus also includes a processor configured to execute the logic, wherein the processor is powered via the alternating current (AC) power outlet.

18 Claims, 5 Drawing Sheets

APPARATUS FOR INTERFACING WIRELESS DEVICES TO A PERIPHERAL DEVICE

CROSS REFERENCE TO RELATED APPLICATIONS

This claims priority to U.S. Provisional Patent Application No. 61/753,599, filed Jan. 17, 2013, and U.S. Provisional Patent Application No. 61/755,712, filed Jan. 23, 2013, both of which are incorporated herein by reference.

TECHNICAL FIELD

Embodiments of the present disclosure relate to use of peripheral devices with host computing devices and more particularly, to provide interfaces for wireless computing devices for coupling to older model printing devices.

BACKGROUND

A peripheral device is a device that is connectable to an input/output interface of a computing device such as a computer. Examples of peripheral devices include, for example, a multi-function printer including print, scan, and/or fax capabilities, a speaker, a monitor, a mouse, an external hard drive, and so on. Subsequent releases of a device (e.g., newer models of a device) typically have increased features and/or capabilities relative to prior releases of the device (e.g., older models of the device). For example, many newer model computing devices have wireless connection capabilities while older model peripheral devices may not include or support such wireless connection capabilities. Thus, a user of a newer model computing device may be unable to wirelessly interact with an older model peripheral device without the user having to replace the older model peripheral device with a newer model that supports wireless connection capabilities. Furthermore, many users have multiple computing devices with various connection capabilities. Such users may be unable to interact via all of their computing devices with an older model peripheral device without having to replace the older model peripheral device. Older model peripheral devices may also utilize older formats for handling jobs from computing devices such as, for example, print jobs. Print jobs from newer model computing devices may be in a different format than an older model peripheral device can handle.

SUMMARY

In various embodiments, the present disclosure provides an apparatus including an arrangement configured to couple the apparatus to an alternating current (AC) outlet. The apparatus further includes a plurality of interfaces, wherein a first interface of the plurality of interfaces is configured to couple the apparatus to a wireless computing device, wherein a second interface of the plurality of interfaces is configured to couple the apparatus to a first device that is peripheral to the wireless computing device, wherein the first interface is separate from the second interface, and wherein the apparatus is separate from each of the wireless computing device and the first device that is peripheral to the wireless computing device. The apparatus also includes a memory configured to store logic, wherein the logic is configured to receive, via the first interface, an operation from the wireless computing device, and send, via the second interface, the operation to the first device that is peripheral to the wireless computing device. The apparatus also includes a processor configured to execute the logic, wherein the processor is powered via the alternating current (AC) power outlet.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
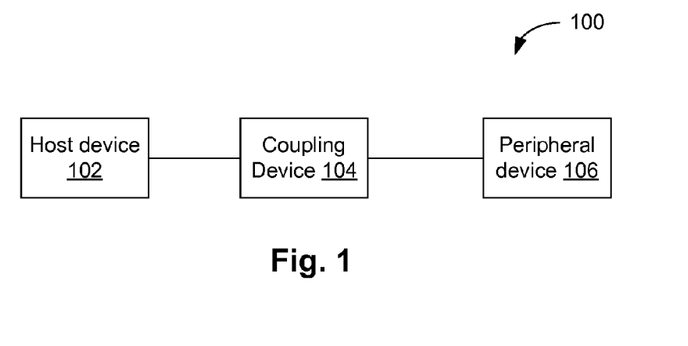
FIG. 1 schematically illustrates a host device coupled to a printing device via a coupling device.

FIG. 1 illustrates an arrangement 100 that includes a host computing device 102, a coupling device 104, and a peripheral device 106. In one embodiment, the peripheral device is a printing device. The host computing device 102 generally is a computing device that includes computing capabilities. Such computing devices include, for example, desktop computers, tower computers, laptop computers, notebook computers, tablet computers, personal digital assistants (PDAs), and mobile phones. This list of possible computing devices is provided merely as an example and is not meant to be limiting.

The peripheral device 106 is a device for use with computing devices. Examples of peripheral devices include speakers, monitors, mice, external hard drives, printing devices, scanning devices, multi-function printing devices that are capable of printing, scanning, faxing, etc. For clarity and ease of understanding, the peripheral device 106 will be referred to herein as a printing device.

The coupling device 104 couples the host computing device 102 and the printing device. The coupling is at least a communicative coupling, but can also be a physical coupling. Thus, the coupling device 104 provides a communication conduit between the host computing device 102 and the printing device. As previously noted, the host computing device 102 can also be a portable handheld device such as, for example, a laptop computer, a notebook computer, a tablet computer, a personal digital assistant (PDA), and a smart phone, which can connect wirelessly to the coupling device 104 to be able to print to the peripheral device 106, without any additional host device 102, such as, for example, a desktop computer, a tower computer, etc. that is connected via a wired connection directly to the coupling device 104.

Figure 2:
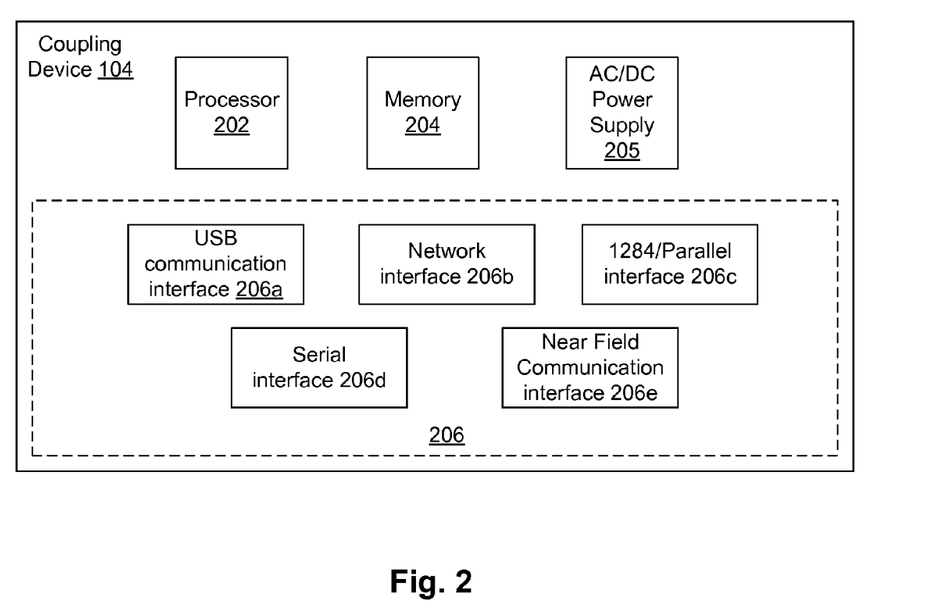
FIG. 2 schematically illustrates an example of the coupling device of FIG. 1.

FIG. 2 schematically illustrates an embodiment of the coupling device 104. The coupling device 104 generally includes a processor 202, a memory 204, and one or more interfaces 206. The coupling device 104 further includes an alternating current (AC)/direct current (DC) power supply 205. The AC/DC power supply 205 is configured to provide power to the processor 202, memory 204 and any interface requirements of the interfaces 206. The processor 202 can be in the form of one or more processors, multi-processing cores, etc., that can be configured as a system on chip (SOC). More particularly, the processor 202 can be configured as a printer SOC. The memory 204 can include various types of memory such as, for example, random access memory (RAM), flash memory, etc. The interfaces 206 can include multiple types of communication interfaces such as, for example, a Universal Serial Bus (USB) communication interface 206a, a network interface 206b (e.g., a local access network (LAN) or a wide area network (WAN) based upon interfaces such as, for example, Ethernet, Wi-Fi, Bluetooth, etc.), a 1284/parallel interface (IEEE standard 1284) 206c, a serial interface 206d, and/or Near Field Communication (NFC) 206e. Examples of interface protocols for the interfaces include USB protocol, 1284/parallel protocol, Ethernet protocol, Wi-Fi protocol, Bluetooth protocol, serial protocol, NFC protocol, etc. The list of communication interfaces and protocols is merely an example of the possibilities and is not meant to be limiting. The memory 204 also stores logic, in the form of software and/or firmware, which can be executed by the processor 202.

The coupling device 104 can be coupled to the printing device via a wired connection via a wired interface of the interfaces 206. The coupling device 104 can be coupled to the host computing device 102 via a wireless connection or a wired connection, via a wireless interface or a wired interface of the interfaces 206.

For older model printing devices, often referred to as legacy printers, there may be a very limited number of ways for a device to couple to and communicate with such older model printing devices. In general, most older model printing devices need to be physically coupled to a host computing device (or a wired computing device) via a wired connection. Thus, the coupling device 104 can be physically coupled to the printing device via a cable (not illustrated) extending from the coupling device 104 to the printing device. The cable (not illustrated) can include a USB type plug that may be plugged into a USB port of the printing device. Other types of physical connections may be utilized depending upon the type of ports included on the printing device and the interfaces 206 included with the coupling device 104. Furthermore, if the printing device includes wireless capabilities, then the coupling device 104 can be coupled to the printing device via a wireless connection, depending upon the interfaces 206 included with the coupling device 104.

Depending upon the connection capabilities of the host computing device 102, the host computing device 102 can be coupled to the coupling device 104 via various types of connections via one of the interfaces 206 of the coupling device 104. For example, depending upon the interfaces 206 included with the coupling device 104, the host computing device 102 can be coupled to the coupling device 104 via a USB connection, a Wi-Fi connection, a Bluetooth connection, NFC connection, an Ethernet connection, etc. Thus, the host computing device 102 can be coupled to the coupling device 104 via either a wired connection (an appropriate cable between the coupling apparatus 104 and the host computing device 102) or a wireless connection.

The coupling device 104 includes logic in the form of software and/or firmware, stored in the memory 204, configured to provide functionality to the printing device and, depending upon the application, the host computing device 102. Logic can be included in the coupling device 104 that, as previously described, provides the ability for various types of connections via interfaces 206 of the coupling device 104 between the printing device and the host computing device 102. For example, the coupling device 104 can be coupled to the printing device via a wired connection and the coupling device 104 can communicate with the host computing device 102 via a wireless access interface. Thus, the host computing device 102 can wirelessly interact with the printing device. For example, the interfaces 206 of the coupling device 104 can include wireless access interfaces such as, for example, a Bluetooth interface, a Wi-Fi/Wi-Fi-direct interface, NFC, etc., along with the appropriate logic in memory 204.

Additionally, logic in the form of software and/or firmware can be included within memory 204 of the coupling device 104 to enable automatic printing via the printing device. For example, the logic can be included to cause the coupling device 104 to automatically access and retrieve documents from various locations within a network such as, for example, the Internet, the Cloud (a network-accessible computing platform), a wireless service, NFC "Tap and Print", etc. Logic can be further included on the coupling device 104 to convert retrieved documents so that the documents can be printed by the printing device. Such automatic retrieval and printing of jobs can be scheduled directly by the logic included on the coupling device 104 to automatically retrieve content from the network, convert the content for printing, and print the content. Logic is also further included in the memory 204 to allow operations received by the coupling device 104 from computing devices to be converted to a format or protocol that can be executed by the printing device.

Software and firmware for the coupling device 104 can be automatically upgraded based upon access to various networks by the coupling device 104. Likewise, software for the coupling device 104 can be automatically installed on the coupling device 104 based upon access to various networks by the coupling device 104. Accordingly, software such as, for example, drivers related to the printing device for various computing devices, can be automatically installed onto the coupling device 104. Likewise, software for various other types of computing devices, such as, for example, desktop computers, tower computers, laptop computers, notebook computers, tablet computers, personal digital assistants (PDAs), and mobile phones, etc., can be auto-installed onto the coupling device 104. The software for the various computing devices installed on the coupling device 104 can allow the coupling device 104 to receive a print job from a particular computing device, convert the print job to the appropriate format for the printing device and forward the print job to the printing device for printing. Thus, the coupling device 104 acts as a pass-through device that allows for communication between the printing device and a variety of computing devices 102.

Figure 3A:
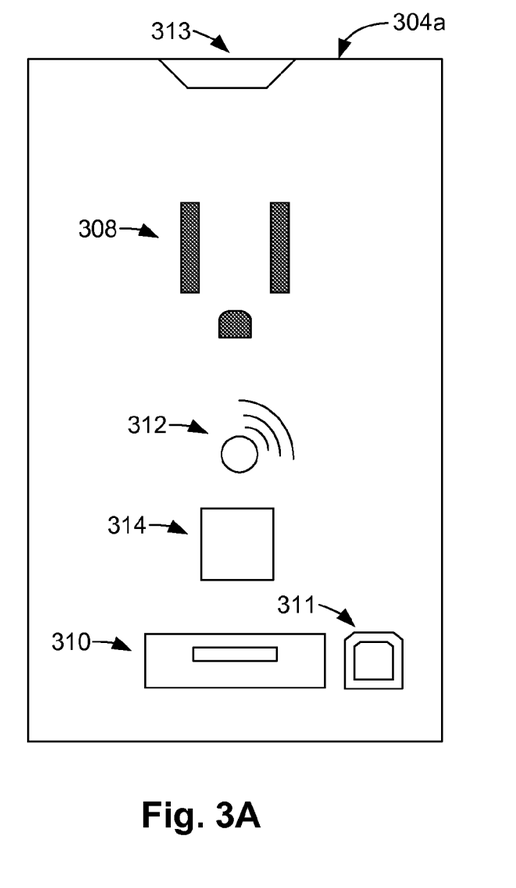
FIG. 3A illustrates an example embodiment of the coupling device of FIG. 2.
Figure 3B:
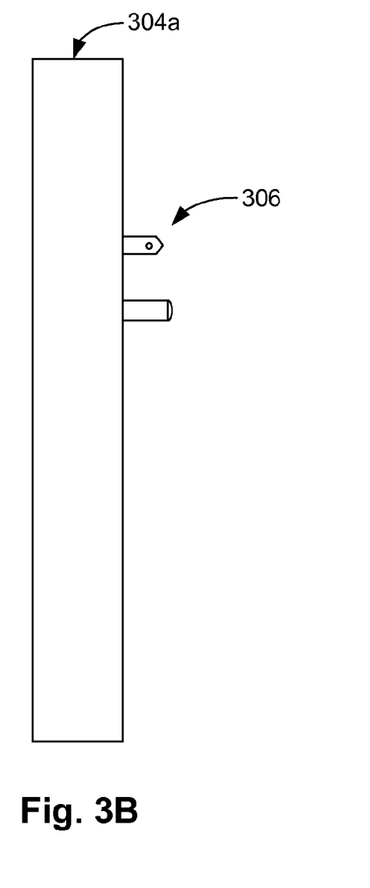
FIG. 3B is a side elevation view of the coupling device of FIG. 3A.

FIG. 3A illustrates an example of coupling device 304a that may be configured similarly to coupling device 104. The coupling device 304a is configured to couple to and engage an alternating current (AC) outlet (not illustrated). FIG. 3B is a side view of the coupling device 304a that is illustrated in FIG. 3A. It can be seen that the coupling device 304a includes a plug arrangement 306 that includes prongs for plugging into an AC power outlet (not illustrated).

The coupling device 304a in FIG. 3A includes an arrangement 308 configured to receive prongs of electrical devices (not illustrated), where the prongs are configured to be plugged into an AC power outlet. Thus, such electrical devices as the printing device can plug into and receive AC power from the coupling device 304a when the coupling device 304a has been coupled to and is engaged with an AC power outlet. The arrangement 306 allows for two prongs and a grounding prong to be plugged into the coupling device 304a. The arrangement of 306 prongs and 308 receptacles can be designed and delivered differently depending upon country requirements/specifications to be utilized but for this example is for USA implementation.

The coupling device 304a also includes a USB port (i.e. a USB host female connector) 310 to allow for the printing device to be coupled to the coupling device 304a via a USB cable (not illustrated). The coupling of the printing device to the coupling device 304a via the USB port 310 allows for the printing device to communicate with the coupling device 304a in a manner as previously described.

Furthermore, DC power for USB communication Vbus requirements of 310 can be provided from the coupling device 304a to the printing device via the USB connection. The coupling device 304a is also powered by the internal AC/DC power supply 205 via the engagement of coupling device 304a with the AC power outlet (not illustrated). The USB host port 310 could also be used for a USB device charging port connection for charging batteries on USB portable devices.

An optional USB device port 311 can be included and used to couple other devices (not illustrated) to the coupling device 304a via a USB connection. For example, a computing device such as, for example, a laptop computer, a notebook computer, a tablet computer, a personal digital assistant (PDA), and a mobile phone, etc., can be coupled to the coupling device 304a via the USB device port 311 to allow such a computing device to communicate with the printing device via the coupling device 304a. Furthermore, if the computing device coupled to the USB port 311 is the host computing device 102, then print jobs from the host computing device 102 can "pass-through" the coupling device 304a to the printing device. Such pass-through is due to the fact that the coupling device 304a appears to the host computing device 102 as the printing device upon enumeration of the coupling device 304a to the host computing device 102, as further described herein.

Once the printing device is coupled to the coupling device 304a via the USB port 310, the host computer 102 can communicate wirelessly with the coupling device 304a via a wireless interface and thereby communicate with the printing device. Furthermore, the coupling device 304a illustrated in FIGS. 3A and 3B can allow for the host device 102 and the printing device to be located in different rooms. The coupling device 304a simply needs to be placed in a room where the printing device is located so that the printing device can be coupled to the coupling device 304a.

The coupling device 304a can optionally include light emitting diodes (LEDs) 312 and/or 313 that indicate a mode of operation or use such as, for example, a wireless communication connection to host device. The use of multiple LEDs 312 and 313, and/or multi-colored LEDs for each, can allow other operating conditions or modes of operation of the coupling device 304a to be indicated by unique colors. The coupling device 304a can also include an input 314 in the form of a button for allowing for Wi-Fi Protected Set-up (WPS) activation of the coupling device 304a. Such a WPS push button 314 on the coupling device 304a can allow for a WPS connection process to connect the coupling device 304a to other WPS-enabled wireless devices for receiving print jobs from such wireless computing devices to pass along to the printing device. The coupling device 304a can also include a screw (not illustrated) to secure the coupling device to an AC power wall outlet by replacing a standard wall receptacle cover (not illustrated) with the coupling device 304a.

Figure 3C:
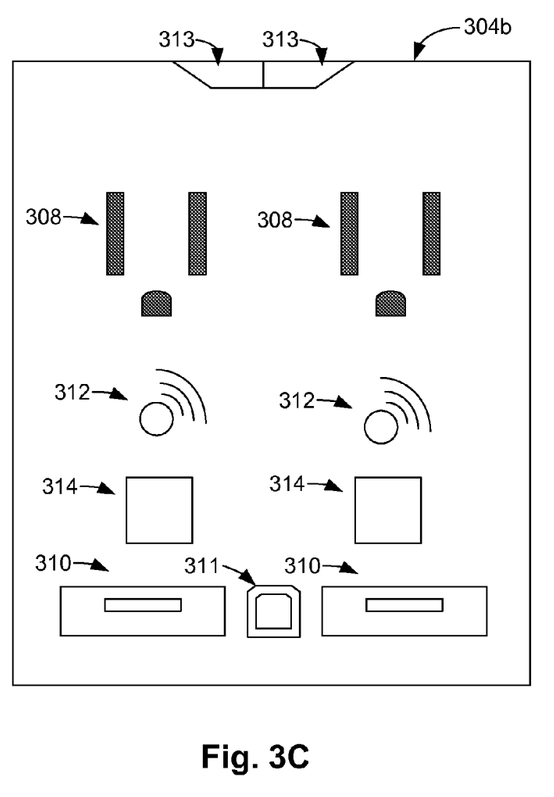
FIG. 3C illustrates another example embodiment of the coupling device of FIG. 2.
Figure 3D:
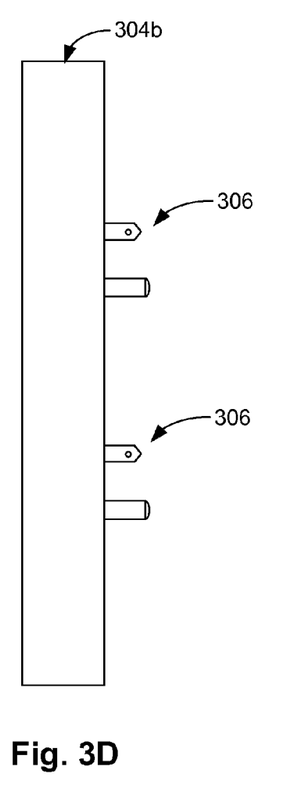
FIG. 3D is a side elevation view of the coupling device of FIG. 3C.

FIGS. 3C and 3D illustrate another embodiment of a coupling device 304b similar to the coupling device 304a illustrated in FIGS. 3A and 3B. The coupling device 304b illustrated in FIGS. 3C and 3D is a dual port coupling device that may be configured similarly to the coupling device 104. The coupling device 304b is configured to be coupled to and engage a dual AC power outlet. Thus, as can be seen in FIG. 3D, which is a side view of the coupling device 304b, the coupling device 304b includes two arrangements 306 that each includes prongs for plugging into an AC power outlet (not illustrated). The coupling device 304b further includes two arrangements 308 configured to receive prongs of electrical devices (not illustrated), where the prongs are configured to be plugged into an AC power outlet. Thus, such electrical devices can plug into and receive power from the coupling device 304b when the coupling device 304b has been coupled to and is engaged with an AC power outlet. Each of the arrangements 308 allows for two prongs and a grounding prong to be plugged into the coupling device 304a. The arrangement of 306 prongs and 308 receptacles can be designed and delivered differently depending upon country requirements/specifications to be utilized but for this example is for USA implementation.

Two USB ports (USB host female connectors) 310 are included to allow for the printing device to plug into the coupling device 304b and thereby communicate and receive DC power for USB communication Vbus requirements of 310 from the coupling device 304b. The second USB port can allow for a second printing device to communicate with and receive DC power for USB communication Vbus requirements of 310 from the coupling device 304b. Thus, for example, both a black and white printer and a color printer could simultaneously be coupled to the coupling device 304b. The host computer 102 can communicate wirelessly with the coupling device 304b and thereby communicate with the printing device or devices coupled via the USB port or ports 310 of the coupling device 304b.

An optional USB port 311 can also be included and used to couple other devices (not illustrated) to the coupling device 304b via a USB connection. For example, a computing device such as, for example, a laptop computer, a notebook computer, a tablet computer, a personal digital assistant (PDA), and a mobile phone, etc., can be coupled to the coupling device 304b via one of the USB device ports 311 to allow the computing device to communicate with the printing device via the coupling device 304b. Furthermore, if the computing device coupled to the USB port 311 is the host computing device 102, then print jobs from the host computing device 102 can "pass-through" the coupling device 304b to the printing device. Such pass-through is due to the fact that the coupling device 304b appears to the host computing device 102 as the printing device upon enumeration of the coupling device 304b to the host computing device 102, as further described herein.

Multiple LEDs 312 and/or 313, along with WPS inputs 314, can also be included on the coupling device 304b, as previously described with respect to the coupling device 304a. The coupling device 304b can also include a screw (not illustrated) to secure the coupling device to an AC wall outlet as described previously for coupling device 304a. Furthermore, for the coupling devices 304a, 304b illustrated in FIGS. 3A-3D, other wireless devices (not illustrated) can communicate with the coupling devices 304a, 304b, as will be discussed further herein.

Figure 4A:
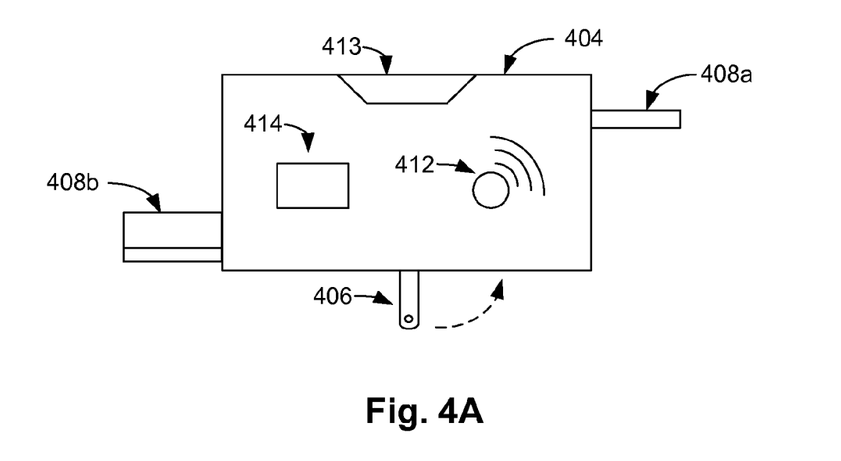
FIG. 4A illustrates another example embodiment of the coupling device of FIG. 2.

FIG. 4A illustrates another, more portable, embodiment of a coupling device 404 that may be configured similarly to the coupling device 104. The coupling device 404 includes an AC plug arrangement 406 for plugging into an AC power outlet. In accordance with various embodiments, the AC plug arrangement 406 can be configured to fold into the coupling device 404 (as indicated by the dotted line) when the coupling device 404 is not to be coupled to an AC power outlet. The AC plug arrangement 406 can also be attached to a cord (not illustrated) that can be retractable into the coupling device 404 or that can wrap around the coupling device 404.

The coupling device 404 includes one or more USB male connectors 408. One or both of the USB male connectors 408 can be configured to provide a USB host connection in the form of a male Type A USB connector (illustrated in FIGS. 4A and 4B as connector 408a). One or both of the USB male connectors 408 can be configured to provide a USB device connection in the form of a male Type B USB connector (illustrated in FIGS. 4A and 4B as connector 408b). The USB male connectors 408 can be in a fold-out type arrangement that allows for the USB male connectors 408 to be folded into and out of the coupling device 404. The USB male connectors 408 can also be attached to respective plug-in cords (not illustrated). The USB male connectors 408 can be attached to captive cords that can be retractable into coupling device 404. Additionally, the cords can wrap around coupling device 404. The USB male connectors 408 can be used to couple the coupling device 404 to the printing device and the host computer 102. The host computer 102 can also communicate wirelessly with the coupling device 404. This can allow the host computer 102 to thereby communicate wirelessly with the printing device via the coupling device 404. In accordance with various embodiments, one or both of the USB male connectors 408 can be replaced with a USB female connector (not illustrated). Such USB female connectors can be used with standard USB A-B cables for connecting the coupling device to a host computing device and/or printing device (not illustrated) if desired.

Figure 4B:
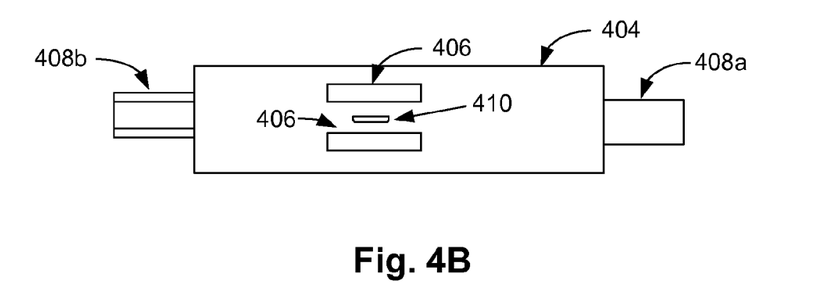
FIG. 4B is a bottom elevation view of the coupling device of FIG. 4A.

The USB male connectors 408 can also be used to couple other devices (not illustrated) to the coupling device 404 via a USB connection. For example, a computing device such as, for example, a smart phone, a tablet, a laptop, etc., can be coupled to the coupling device 404 via one of the USB host male connectors 408 to allow the computing device to communicate with the printing device via the coupling device 404. Furthermore, if the computing device coupled to one of the USB host male connectors 408 is the host computing device 102, then print jobs from the host computing device 102 can "pass-through" the coupling device 404 to the printing device. Such pass-through is due to the fact that the coupling device 404 appears to the host computing device 102 as the printing device upon enumeration of the coupling device 404 to the host computing device 102, as further described herein.

As can be seen in FIG. 4B, which is a bottom view of the coupling device 404, the coupling device 404 can also include a micro-USB female type connector (port) 410 to allow the coupling device 404 to receive DC power from a common micro-USB charger used for charging handheld devices like smart phones, tablets, etc. instead of using power supplied by the internal AC/DC power supply 205 supplied from the AC source receptacle that the 406 prongs are plugged into. The USB female type connector 410 may be located on the top of the coupling device 404 if desired. Additionally, a second USB female type connector (not illustrated) may be located on the top of the coupling device 404 if desired. The DC power can be used to power the coupling device 404 as well as providing the DC power for USB communication Vbus requirements for the USB male device plug for the printing device to which the coupling device 404 is coupled.

The coupling device 404 can also include one or more LEDs 412 and/or 413, which can be multi-colored, and a WSP input 414, as previously described with respect to the coupling devices 304a, 304b.

Since the coupling device 404 can include fold-out plug arrangements and/or plugs that are attached to cords that may retract into the coupling device 404 or be wrapped around the coupling device 404, the coupling device 404 is portable by a user. Thus, the user can couple the coupling device 404 to one of the user's computing devices and to a guest peripheral device such as a guest printing device located, for example, at a hotel. The user can also couple the coupling device 404 to an AC power outlet. The user can now send a print job from the user's personal computing device to the coupling device 404, which then provides the print job to the guest printing device. Thus, the user does not need to use or provide information to whatever guest computing device is coupled to the guest printing device.

Figure 5:
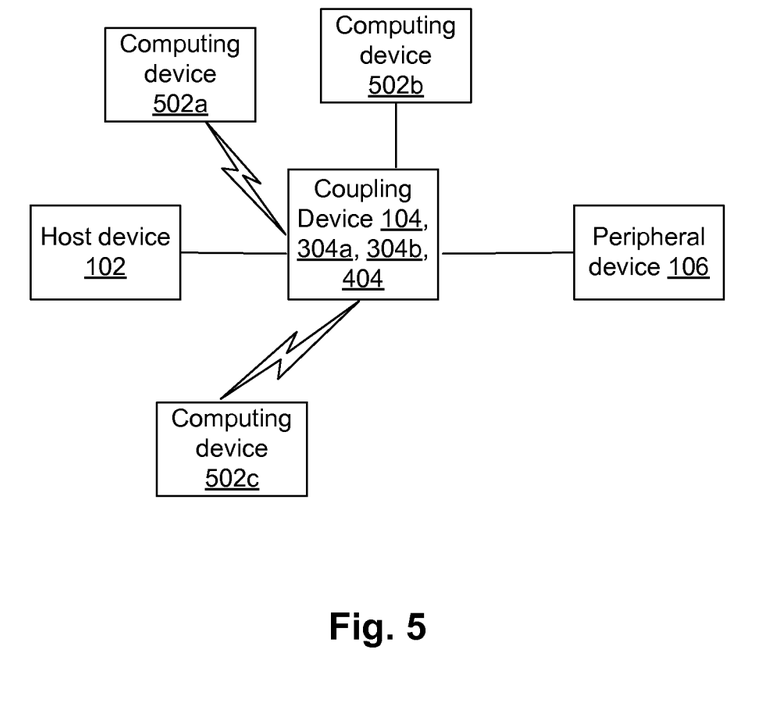
FIG. 5 schematically illustrates a plurality of computing devices coupled to the printing device via a coupling device of FIGS. 2-4.

As can be seen in FIG. 5, multiple computing devices 502a, 502b, 502c, can also interact with the printing device (peripheral device 106) via wireless connection (computing devices 502a, 502c) and wired connections (computing device 502b) with one of the coupling devices 104, 304a, 304b and 404 due to the presence of wireless access interfaces and other types of interfaces. Thus, other computing devices of a user, such as, for example, a laptop computer, a notebook computer, a tablet computer, a personal digital assistant (PDA), and a mobile phone, etc. could be used to interact with the printing device via one of the coupling devices 104, 304a, 304b or 404 via a wireless connection. Thus, the coupling devices 104, 304a, 304b and 404 add wireless capabilities to the printing device that allow for a variety of other computing devices to interact with the printing device. Likewise, multiple computing devices can also couple to and interact with one of the coupling devices 104, 304a, 304b and 404 via wired connections and/or networks. The various connections can be different among the computing devices and the coupling devices 104, 304a, 304b and 404 depending upon the types of the computing devices and their capabilities. Furthermore, no host computing device 102 needs to be used with coupling devices 104, 304a, 304b and 404, if desired. The coupling devices 104, 304a, 304b and 404 can be used without a host computing device 102, for example, with one or more wireless devices in order to provide wireless capabilities to the printing device if desired. In general, the printing device will still be connected to one of the coupling devices 104, 304a, 304b or 404 via a wired connection due to the fact that in many embodiments, the printing device is an older model printing device, such as a legacy printer, that has fewer connection capabilities than newer model printing devices.

If the coupling device 104 includes a LAN interface and corresponding logic included within memory 204, the host computing device 102 and the printing device can communicate with other devices included within the LAN via one of the coupling devices 104, 304a, 304b or 404. Likewise, the other devices included within the LAN can communicate with the host computing device 102 and the printing device via one of the coupling devices 104, 304a, 304b or 404. Thus, the coupling devices 104, 304a, 304b and 404 can add LAN connectivity to the printing device for local access networks for multiple computing devices if desired.

Additionally, a wireless LAN (Wi-Fi) type arrangement can also be utilized for connecting multiple computing devices to the coupling devices 104, 304a, 304b and 404. Thus, an access point or a micro-access point (not illustrated) may be utilized to couple various computing devices to one of the coupling devices 104, 304a, 304b or 404. In general, the printing device will still be connected to one of the coupling devices 104, 304a, 304b or 404 via a wired connection due to the fact that in many embodiments, the printing device is an older model printing device, such as a legacy printer, that has fewer connection capabilities than newer model printing devices.

In accordance with various embodiments, one of the coupling devices 104, 304a, 304b or 404 receives an operation, such as, for example, a print job from one of computing devices 502a, 502b, 502c such that the one of the coupling devices 104, 304a, 304b or 404 will forward the print job to the printing device. However, the print job may be in a format that is different than the format required for the printing device to perform the print job. Thus, the one of the coupling devices 104, 304a, 304b or 404 converts the print job received from the computing device 502a, 502b, 502c prior to forwarding the print job to the printing device. For example, the computing device may be a wireless device 502a, 502b, 502c and thus, may provide the print job to the one of the coupling devices 104, 304a, 304b or 404 via a wireless interface. The print job received from the wireless device may be a color print job that is in a unirast format. However, if the printing device cannot handle print jobs in the unirast format, then the one of the coupling devices 104, 304a, 304b or 404 can convert the print job to a color format that the printing device understands such as, for example, a PCL3GUI format or a PCL6 format.

In accordance with various embodiments, the coupling devices 104, 304a, 304b and 404 are configured to allow for various types of print jobs and print applications from various services such as, for example, AirPrint, Cloud Print and e-Print. AirPrint is a feature in Apple® operating systems starting with OS X Lion and iOS 4.2, for printing via a wireless LAN (Wi-Fi), either directly to AirPrint-compatible printers, or to non-compatible printers by way of, for example, a Microsoft® Windows®, Apple® OS X or GNU/Linux PC. Cloud Print is a Google® service that was created to allow any Cloud Print-aware application (web, desktop, mobile) on any device in the "network cloud" (a network-accessible computing platform) to print to any printer without Google® having to create and maintain printing subsystems for all the hardware combinations of client devices and printers, and without the users having to install device drivers to the client, but with documents being fully transmitted to Google®. e-Print is a print application developed by Hewlett-Packard®. Other types of print jobs and print applications from other services may also be supported.

If none of the computing devices 502a, 502b, and 502c can provide print jobs that are appropriate for the printing device, the host computing device 102 can still provide print jobs through one of the coupling devices 104, 304a, 304b or 404 to the printing device. Thus, print jobs from the host computing device 102 can "pass-through" one of the coupling devices 104, 304a, 304b or 404 to the printing device, as previously mentioned. Such pass-through is due to the fact that the coupling devices 104, 304a, 304b and 404 appear to the host computing device 102 as the printing device upon enumeration of the coupling devices 104, 304a, 304b and 404 to the host computing device 102, as further described herein.

In one embodiment, in order to "enumerate," i.e. properly couple and configure the coupling devices 104, 304a, 304b and 404 to the host computing device 102, when one of the coupling devices 104, 304a, 304b and 404 is coupled to the printing device, such coupling device reads the configuration information from the printing device and then reports itself to the host computing device 102 as the same printing device. Various interfaces, except the printer interface, are echoed from the host computing device 102 to the printing device and vice versa. This is the general pass-through function and the standard printer driver on the host computing device 102 for the printing device will work as if there was nothing, i.e., no coupling device, between the host computing device 102 and the printing device.

In another embodiment, the coupling devices 104, 304a, 304b and 404 may re-map all end points and interfaces, as well as the 1284 device identification (ID) string of the printing device. This allows the printing device to also support other protocols that the printing device may not currently support. This also allows the printing device to be mapped to a different model printer for support of full-featured print drivers. The coupling device reads the 1284 device ID string from the printing device and uses the information to decide the languages that the printing device will support. Then, if the languages match the supported languages of the coupling device, the printing device can be supported by the coupling device.

In accordance with various embodiments, the coupling devices 104, 304a, 304b or 404 can also allow the printing device to perform other functions such as scanning and/or faxing from a wireless device. For example, a wireless device can access a network site located on, for example, the Internet, and a page from the network site can be provided to one of the coupling devices 104, 304a, 304b or 404 and then to the printing device. The printing device can then place the page in the proper format for a scanned document or a faxed document that can be provided back to one of the coupling devices 104, 304a, 304b or 404 and on to the original wireless device that provided the page, or to another wireless device.

Thus, the coupling devices 104, 304a, 304b and 404 can allow for a USB device, such as the printing device, to be plugged into the coupling devices 104, 304a, 304b and 404. The USB device can then be echoed or modified back to the host computing device 102. Any USB interface on the USB device that is detected will be scanned to determine if it can be supported by the coupling devices 104, 304a, 304b and 404. If any protocols are found that can be supported, then the coupling devices 104, 304a, 304b and 404 will be able to add wireless printing support to the printing device. The coupling devices 104, 304a, 304b and 404 can also provide conversion from standard wireless protocols or standard USB protocols to the protocols that are supported by the printing device. In general, the configuration is simple for the wireless interfaces. Furthermore, the coupling devices 104, 304a, 304b and 404 can provide support for a large number of printers irrespective of the manufacturers. The coupling devices 104, 304a, 304b and 404 thus generally serve as a print controller or a print server. Additionally, use of one of the coupling devices 104, 304a, 304b and 404 with an older model printing device can provide greater functionality and use of the printing device for a user of the printing device.

In accordance with various embodiments, an article of manufacture may be provided that includes a storage medium having instructions stored thereon that, if executed, result in the operations described herein with respect to certain aspects of methods and/or various operations discussed herein. In an embodiment, the storage medium comprises some type of non-transitory memory, such as memory 204. In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus comprising:
an arrangement configured to couple the apparatus to an alternating current (AC) outlet;
a plurality of interfaces, wherein a first interface of the plurality of interfaces is configured to couple the apparatus to a wireless computing device, wherein a second interface of the plurality of interfaces is configured to couple the apparatus to a first device that is peripheral to the wireless computing device, wherein the first interface is separate from the second interface, and wherein the apparatus is separate from each of the wireless computing device and the first device that is peripheral to the wireless computing device;
a memory configured to store logic, wherein the logic is configured to
receive, via the first interface, an operation from the wireless computing device, and
send, via the second interface, the operation to the first device that is peripheral to the wireless computing device; and
a processor configured to execute the logic, wherein the wireless computing device communicates with the first device via the apparatus, wherein the wireless computing device does not communicate directly with the first device for transmitting the operation from the wireless computing device to the first device, and wherein the wireless computing device is incapable of communicating directly with the first device, by bypassing the apparatus.

2. The apparatus of claim 1, wherein:
the first interface is a wireless interface; and
the second interface is a universal serial bus interface.

3. The apparatus of claim 1, wherein a third interface of the plurality of interfaces is configured to couple the apparatus to a wired computing device.

4. The apparatus of claim 3, wherein:
the first interface is a wireless interface;
the second interface is a universal serial bus interface; and
the third interface is one of (i) a universal serial bus interface, (ii) a network interface, (iii) a wireless interface, (iv) an Ethernet interface, (v) a 1284/parallel interface, or (vi) a serial interface.

5. The apparatus of claim 1, wherein:
the first interface is a wireless interface;
the second interface is a universal serial bus interface;
the apparatus further comprises a third interface in the form of a universal serial bus interface.

6. The apparatus of claim 5, wherein:
the second interface comprises a first universal serial bus female connector; and
the third interface comprises a second universal serial bus female connector.

7. The apparatus of claim 5, wherein:
the second interface comprises a first universal serial bus male connector; and
the third interface comprises a second universal serial bus male connector.

8. The apparatus of claim 7, wherein:
the first universal serial bus male connector is coupled to a first cord that is coupled to the apparatus; and
the second universal serial bus male connector is coupled to a second cord that is coupled to the apparatus.

9. The apparatus of claim 8, wherein:
the first cord that is retractable within the apparatus; and
the second cord that is retractable within the apparatus.

10. The apparatus of claim 7, wherein:
the first universal serial bus male connector is configured to fold into the apparatus; and
the second universal serial bus male connector is configured to fold into the apparatus.

11. The apparatus of claim 1, wherein the arrangement is configured to fold into the apparatus.

12. The apparatus of claim 1, wherein:
the arrangement is a first arrangement; and
the apparatus further comprises a second arrangement configured to couple the apparatus to the alternating current (AC) outlet.

13. The apparatus of claim 1, further comprising a port configured to provide alternating current (AC) power from the alternating current (AC) outlet to an electronic device.

14. The apparatus of claim 13, wherein:
the port is a first port; and
the apparatus further comprises a second port configured to provide alternating current (AC) power to an electronic device.

15. The apparatus of claim 1, further comprising a Wi-Fi Protected Set-Up (WPS) input, wherein the Wi-Fi Protected Set-Up input is configured to enable Wi-Fi Protected Set-Up connection of the apparatus upon activation of the Wi-Fi Protected Set-Up input.

16. The apparatus of claim 15, wherein:
the Wi-Fi Protected Set-Up input is a first Wi-Fi Protected Set-Up input; and
the apparatus further comprises a second Wi-Fi Protected Set-Up input, wherein the second Wi-Fi Protected Set-Up input is configured to enable a second Wi-Fi Protected Set-Up connection of the apparatus upon activation of the second Wi-Fi Protected Set-Up input.

17. The apparatus of claim 1, further comprising a light emitting diode.

18. The apparatus of claim 1, wherein:
the arrangement is a first arrangement;
the first arrangement is further configured to (i) receive AC power from the AC outlet, and (ii) provide AC power to the apparatus; and
the apparatus further comprises a second arrangement configured to (i) couple the apparatus to the peripheral device, and (ii) provide AC power to the peripheral device.

* * * * *